Figure 1:
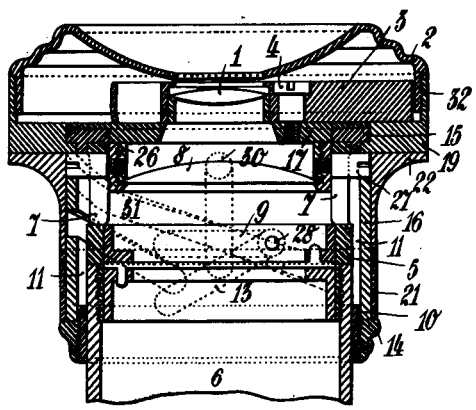

J. B. BAILLE-LEMAIRE.
TELESCOPE WITH VARIABLE MAGNIFICATION.
APPLICATION FILED OCT. 15, 1912.

1,127,720.

Patented Feb. 9, 1915.
3 SHEETS—SHEET 1.

Witnesses
W. K. Boulter
R. L. Wells

Inventor:
Jean B. Baille-Lemaire,
By Wm. E. Boulter,
Attorney

J. B. BAILLE-LEMAIRE.
TELESCOPE WITH VARIABLE MAGNIFICATION.
APPLICATION FILED OCT. 15, 1912.

1,127,720.

Patented Feb. 9, 1915.
3 SHEETS—SHEET 2.

Witnesses:
W. K. Boulter
C. L. Wells

Inventor:
Jean B. Baille-Lemaire
By Wm. E. Boulter
Attorney

J. B. BAILLE-LEMAIRE.
TELESCOPE WITH VARIABLE MAGNIFICATION.
APPLICATION FILED OCT. 15, 1912.

1,127,720.

Patented Feb. 9, 1915.

UNITED STATES PATENT OFFICE.

JEAN BAPTISTE BAILLE-LEMAIRE, OF PARIS, FRANCE.

TELESCOPE WITH VARIABLE MAGNIFICATION.

1,127,720. Specification of Letters Patent. Patented Feb. 9, 1915.

Application filed October 15, 1912. Serial No. 725,780.

*To all whom it may concern:*

Be it known that I, JEAN BAPTISTE BAILLE-LEMAIRE, a citizen of the French Republic, and residing in Paris, France, have invented certain new and useful Improvements in Telescopes with Variable Magnification, of which the following is a specification.

In all optical instruments (such as Galilean telescopes, binoculars with prisms, field glasses, etc.) it is well known that the magnifying power is in inverse ratio to the field, so that if the optical system is designed so as to obtain a great visual penetration, the field is narrowed and the value of general observation reduced. It is therefore of importance to produce observation instruments with which it is possible to obtain at will several magnifying powers, so that the smallest shall give an extended field for instance for finding an object while the highest magnifying power, with a narrower field, is intended to be used for observing the object previously discovered in order to see its details. But as the magnifying power is the relation between the focal lengths of the object glass and of the eye-piece, it will be understood that if the field glasses are arranged so as to enable the lenses of the eye-piece to be changed at will, it will be necessary, after each of the changes, to focus the system again by hand by acting on the telescopic parts of the apparatus. These arrangements have considerable disadvantages for during the focusing of the field glasses, after the change of the eye lenses, the line of sight may be lost, more particularly if moving objects are observed.

For bringing about the change of magnifying power in the telescopes of the Galilean type, it is usual to vary the optical combination by the addition of a convergent lens to the system of eye-pieces, and to modify at the same time the distance separating the object-glass from the eye-piece. It has also been attempted to apply the same construction to prismatic binoculars in which the eye-piece is a Ramsden eye-piece, and the solution used in this case consisted chiefly in the arrangement, on the instrument, of eye-pieces of different powers, which could be shifted in order to be brought successively in line with the axis of the object glass. But with these means the focusing already effected was disturbed, and had to be effected again after each change of the eye-piece.

The present invention is characterized by the fact that, with an optical system comprising a Ramsden eye-piece, more particularly useful for making prismatic binoculars, several magnifying powers are obtained, while at the same time the focusing, already effected for adjusting the binoculars to the sight of the person using it is preserved. This adjustment can be effected separately for each half of the body, to suit the sight of the corresponding eye, in the same conditions as in the case of an ordinary field glass. To that end, the optical elements of the Ramsden eye-pieces, which comprise respectively, for the purpose of changing the magnifying power, a certain number of eye-lenses which can be brought, to the exclusion of each other, into line with the axis of the optical system, are arranged in the interior of heads the circular movements of which about their mount, enable the eye lenses to be changed in front of the corresponding object glasses, and produce automatically suitable relative variations of the distances separating the optical elements constituting the system. In the same conditions, it is possible, by utilizing a suitable mechanical system for transformation of movement, to utilize the angular movements of the head and of the eye-lenses for the purpose of bringing about the corresponding longitudinal movements and modifying the focal distances, without disturbing the focusing either of the eye lenses relatively to the field lens or of the eye lenses and of the field lens relatively to the object glass; these movements may be combined with the variation of aperture of the field diaphragm.

Owing to the arrangements adopted, it is possible to convert an ordinary prismatic binocular into a binocular with several magnifying powers, as it is a question in this case of a simple change of heads. As the binocular thus transformed, can either be adjusted to suit the sight of a person by acting in the ordinary way on the milled nut shifting the telescoping parts of the body or, owing to the independence of the heads, and as usual in accurate field glasses to be submitted to different adjustments for the two halves of the body, according to the different powers of sight of the two eyes of the observer, it will be seen that it is possible to preserve, when changing the magnifying power, the previous adjustment of focusing of the binoculars. It will also be seen that the independence of the heads enables them to be utilized with bodies of binoculars, movable about one and the same axis of rotation, for the purpose of adjusting the centers of the eye-pieces to suit the interocular distance.

Figure 3:
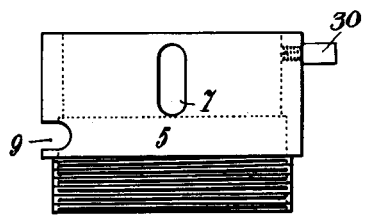
Figure 2:
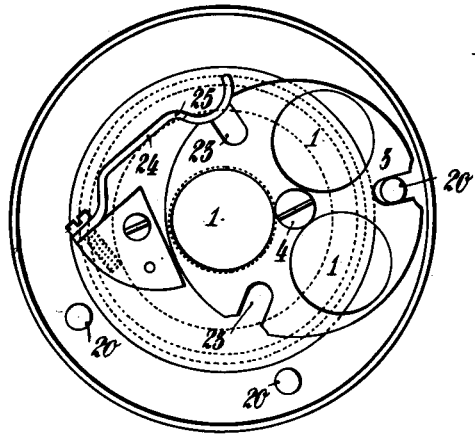
Figure 4:
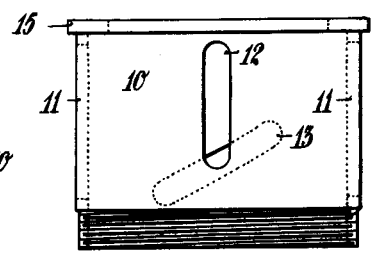
Figure 5:
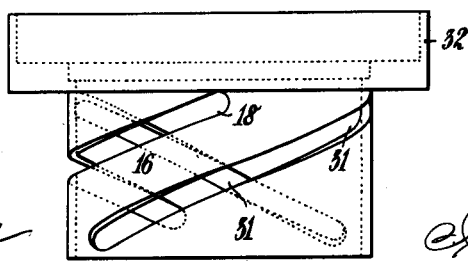
Figure 6:
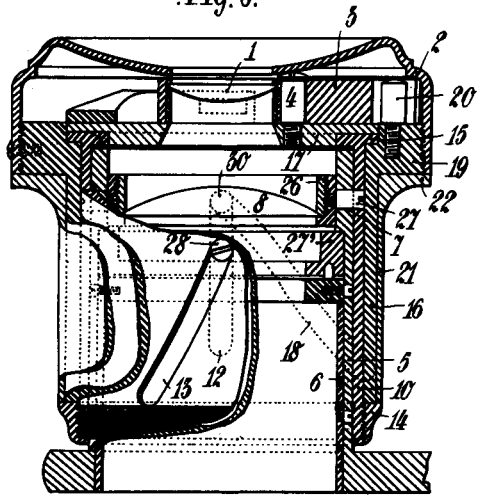
Figure 7:
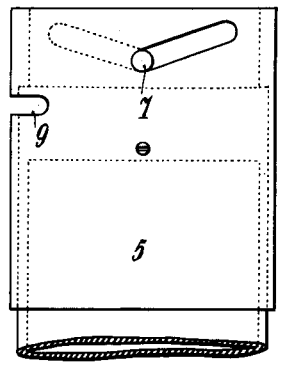
Figure 8:
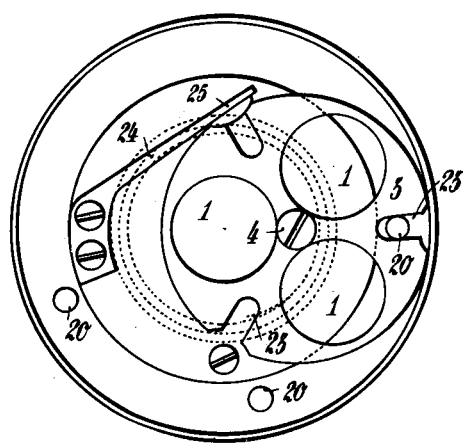
Figure 9:
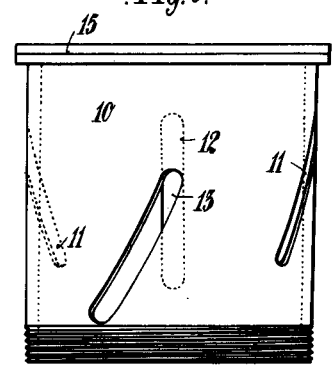
Figure 10:
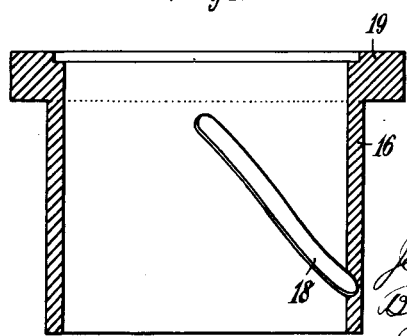
Figure 11:
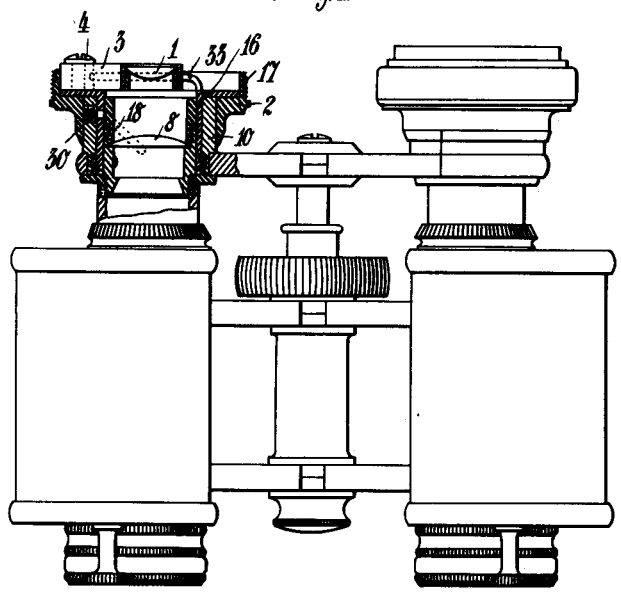
Figure 12:
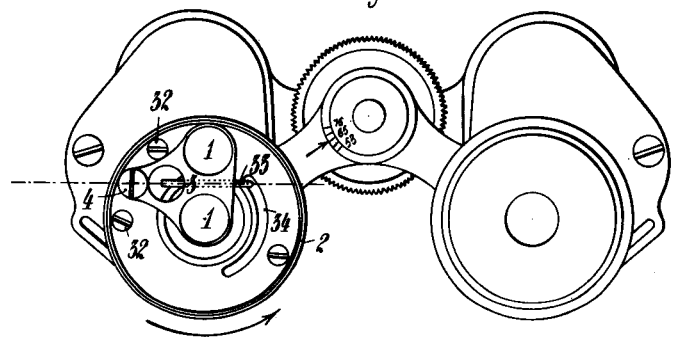
Figure 13:
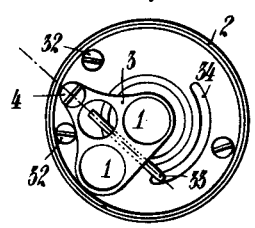

In the accompanying drawings given by way of example, Figure 1 shows on a large scale, and in vertical section, the eye-piece of a binocular with three magnifying powers, constructed in accordance with this invention. Fig. 2 is a corresponding view in plan. Figs. 3–5 are views of the various parts the relative movements of which produce, owing to the change of the eye-lenses, corresponding variations of the focal distances and of the aperture of the field diaphragm. Figs. 6–10 are corresponding views of the parts suitable for a construction similar to that of Figs. 1–5. Fig. 11 shows in general elevation, with vertical section, a prismatic binocular with only two magnifying powers, without variable field diaphragm. Fig. 12 is a corresponding view in plan, and Fig. 13 shows one of the heads after the changing of the eye-lenses resulting in a magnifying power different from that shown in Fig. 12.

In the examples illustrated, the eye-piece lenses 1 producing the various magnifying powers, are inclosed in heads 2 and arranged on one and the same circumference in a circular plate 3 which can turn about its center 4 in such a manner that the axes of the eye lenses 1 can be brought successively into line with the optical axis of the object glass and of the corresponding field lens. The angular movement thus produced, which is perpendicular to the optical axis, is converted into a rectilinear movement parallel to the said axis, in order to vary the focal distance in suitable proportion, and, if necessary, is also converted into another angular movement, parallel to the first, of equal or different amplitude, for enabling the opening or closing of the field diaphragm to be controlled. It is obvious that if the changing of the eye-lenses 1 were to be obtained by any other movement, there would result corresponding modifications in the combination of the mechanical means enabling the said driving movements to be transformed.

The chief characteristic of the invention consists in the utilization of the movements imparted to the eye lenses for the purpose of obtaining different magnifying powers, in order to bring about automatically and simultaneously the corresponding variations of the focal lengths and of the aperture of the field diaphragm, while retaining the proper focusing.

*An optical system with three magnifying powers.*—The arrangement chiefly comprises a series of tubes fitting into each other and automatically given relative movements when the outside of the head is rotated and consequently the eye lenses 1 are moved for changing the magnifying power.

The fitting comprises:

1. A tube 5 (Fig. 3) which is integral with the body of the apparatus in any desired manner by the sheath 6 to which it is secured. This tube is provided with two straight vertical grooves 7 intended to guide the two projections 27 controlling the movement of the field or collector lens 8, in order to bring about automatically the proper setting; with a horizontal groove 9 for controlling the diaphragm, and a screw 30 which guides the helical groove 18 of the driving frame 16.

2. A vertically adjustable tube 10 (Fig. 4) comprising two straight vertical grooves 11 for guiding the projection 27 controlling the field lens a vertical groove 12 forming a guide for the movement parallel to the optical axis of the system, a helical groove 13 for moving of the iris diaphragm. The bottom portion of the tube 10 is provided with a stop nut 14 which incloses between itself and the upper flange 15 of the said tube, the driving frame 16. The latter in its helical movement, can therefore impart to the tube 10 only a movement parallel to the optical axis, the groove 12 preventing it from rotating. The tube 10 is provided at the top with a fixed closing plate or cover 17 provided with a perforation in the center for uncovering the field of vision.

3. A driving frame 16 (Fig. 5) provided with a helical groove 18 intended to give it a movement parallel to the optical axis during its rotation; two helical grooves 31 for controlling the movement of the field lens, in order to avoid disturbances of the focusing. The rim 19 is provided with driving nipples 20. This frame 16 has secured to it a head 2 which protects the whole of the optical system in combination with the fittings 21, 22.

On the plate or cover 17 closing the tube 10, is mounted the plate 3 carrying the eye lenses 1 which are of any construction, achromatic or other, and are symmetrically distributed on one and the same circumference with the pivot 4 of the said plate 3 as a center. The disk 3 is provided with three notches 23, with which the nipples 20 can successively engage as will be hereinafter described. A spring 24 provided with a bead or stop 25, enables the plate 3 to be stopped in a given position, for which the axes of the various eye lenses 1 are in line with the optical axes of the system.

In the tube 5 is arranged the movable mounting 26 of the collector lens 8, provided with projecting guides 27 which engage successively with the vertical grooves 7 of the tube 5, grooves 11 of the tube 10 and helical grooves 31 of the driving frame 16.

The diaphragm is of any known type and controlled by the projecting guide 28 engaging with the groove 13 of the tube 10.

The working is as follows:—In order to change the magnifying power of the apparatus, the rim 32 of the driving frame 16 is rotated, until a disengagement takes place. (The spring 24 at that movement engages with its new recess 23 and consequently determines the position of the new eye-piece in the optical axis). The coincidence of the outer mark of the head with the fixed mark on the body of the apparatus, indicates the new magnifying power obtained. In this movement, the frame 16 is also rotated and undergoes a helical movement which is transformed into a movement parallel to the optical axis, and into an angular movement perpendicular thereto for the purpose of simultaneously obtaining (a) the changing of the eye lenses; (b) the changing of the focal distances; (c) the changing of the diaphragm aperture; all without disturbing the focusing.

(a) The vertical nipple 20 arranged on the flange 19 of the frame 16 and at present engaging with the corresponding opening 23 of the plate 3, in its movement drives the latter about its pivot 4 like a planetary wheel. The stop 25 of the spring 24 is disengaged, the corresponding eye lens 1 is brought in front of the opening of the cover 17, and at the end of the movement, the next nipple 20 engages with the corresponding recess 23 of the plate 3. The spring 24 again locks the movable system and insures perfect agreement of the optical axes of the system.

(b) The frame 16 is guided by its helical groove 18 on the screw 30 screwed into the fixed tube 5. On the other hand, the tube 10 being secured to the frame 16, parallel to the optical axis, owing to the arrangement of the said frame between the flange 15 of the tube 10 and the nut 14, the circular movement is transformed into an upward movement of the whole; the tube 10 and frame 16, relatively to the tube 5 on which they de. The eye glass 1 is moved away from the collector lens 8 which brings about a change in the focal distances. In the said upward movement, the projections 27 were driven by the helical grooves of the frame 16; but guided by the straight grooves 11 of the tube 10, and 7 of the tube 5, the mount with the collector lens 8 has undergone a slight movement parallel to the optical axis (reverse of that of the frame 16) whereby the focusing is corrected.

(c) The frame 16 and the tube 10 having been vertically moved, the groove 13 has driven the screw 28 which is, on the other hand, guided by the horizontal groove 9 of the tube 5. The helical movement is therefore transformed into a circular movement, which produces suitable variation of the aperture of the field diaphragm 27'. The rotation of the head, which produces the change of the eye-lenses, has therefore produced automatically variation of the focal distances, as well as the correction of the focusing and the variation of the aperture of the field diaphragm.

*A modified construction of the system with three magnifying powers,* (Figs. 6–10.)—This modified construction differs from the preceding one only by the different arrangement of the driving slots for moving the various parts of the system engaging with each other. In this construction, the rotation of the heads effects the same simultaneous operations, but for the automatic correction of the focusing, instead of moving the field lens parallel to the optical axis, and in the direction opposite to that of the movement imparted to the driving frame 16, the said field lens is helically moved about the said axis, the direction of the advance being the same as that of the frame 16. The vertical groove of the part 5 becomes helical, as well as the grooves 11 which were also vertical. The driving frame 16 comprises merely a single helical groove 18, the grooves 31 having been done away with. The change of the eye lenses, the variation of opening of the diaphragm and the changing of the focal distances, are obtained as in the preceding case, but during the advance of the whole of the tube 10 and of the frame 16 relatively to the tube 5, the projecting guides 27 are driven in the helical grooves 7 of the said tube. In that way, the mount 26 of the collector lens is given a slight helical movement which corrects the focusing, and the component of which, parallel to the optical axis, has the same direction as the movement of the driving frame 16.

*A system with two magnifying powers.*—In the modified construction shown in Figs. 11–13, the transforming system is simplified, as the change of the eyeglasses 1 brings about only the corresponding variation of the focal distances. The plate 3 carrying two eye-lenses, has the shape of an oscillating sector pivoted about a fixed pin 4 on the upper portion of the mount. The extreme positions of the said sector are marked by a stop and support on the wall of the head 2. In order to bring about conjugated movements, the lower part of the head 2 is fixed by screws 32 to the tube carrying the mount of the field lens 8, in the wall of which is provided a helical groove 18. This groove 18 is guided by a pin 30 mounted in a fixed sheath 10. Moreover, a right angle part 33, the horizontal branch of which is radially mounted in the sector 3, between the eye glasses 1, has its vertical arm pivoted in a suitably milled recess in the fixed tube 10. The circular groove 34 provided in the upper cover 17, enables the latter to turn about the vertical branch of the right angle part. In these conditions, when the head 2 is rotated about itself, so as to bring opposite a fixed mark on the body of the apparatus, the marks of the said head indicating the magnifying power and corresponding to the extreme points of rotation of the head, the tube 16 is driven and brings about: (a) by means of its helical groove 18 engaging with the fixed projection 30, the movement parallel to the optical axis, of the sector 3 carrying the eye-lenses 1; (b) owing to the angular movement produced thereby, the movement of the sector 3 which is driven in the direction of the circumference by its pivot 4 and held in a position determining the changing of the eye-lenses by means of the horizontal branch of the right angle part 33, the vertical branch of which pivots in a recess of the fixed tube 10.

It will be seen that the changing of magnifying power does not affect in any way the ordinary properties of the binoculars. The pivoting arrangement for varying the visual distances and the simultaneous setting by the central milled nut, still remain possible.

What I claim as my invention and desire to secure by Letters Patent is:—

1. In an optical apparatus having an object-glass and Ramsden eyepiece, means for focusing the eyepiece, means independent thereof for varying the magnification comprising in combination a plurality of eye-lenses adapted to be brought severally into coaxial relation with a field lens, and means whereby, when an eye lens is brought into operative position, the relative positions of the object-glass, field lens and eye lens are simultaneously and automatically changed to reproduce the former focusing.

2. In an optical system for binoculars with several magnifying powers, comprising Ramsden eye-pieces, the combination with two tubes carrying object glasses, of two heads which can be rotated and moved longitudinally independently of each other relatively to the tubes, two plates movable angularly, arranged in the said heads and carrying the eye-lenses, means for placing successively the various eye-lenses in front of the two optical axes by rotating the said heads, and for moving simultaneously the two field lenses relatively to the eye-lenses, so as to retain automatically the correct focusing.

3. In an optical system for binoculars with several magnifying powers, comprising Ramsden eye-pieces, the combination with two tubes carrying object-glasses, of two heads independently rotatable and longitudinally movable relatively to the tubes, two angularly adjustable plates arranged in the said heads and carrying the eye-lenses, means for placing successively the said eye-lenses in front of the optical axes and for simultaneously moving each field lens relatively to the corresponding eye-lens, and means for simultaneously automatically varying the opening of the field diaphragm.

4. In a binocular optical system with three magnifying powers and having Ramsden eye-pieces, the combination with a binocular body carrying object glasses, of two tubes extending outside the body of the binoculars, horizontal and vertical grooves arranged in the tubes, projections secured to the tubes, variable field diaphragms and field lenses adjustable in the interior of the said tubes, driving projections arranged on the adjustable rims of the field diaphragms and on the mounts of the field lenses, and passing through the horizontal and vertical grooves provided in the tubes, sleeves sliding on the tubes, and provided with vertical grooves with which engage the projections secured to the tubes, two other opposite vertical grooves and an inclined groove provided in each sleeve for the projections on the field lenses and those on the field diaphragms, driving frames arranged concentrically with the sliding sleeves and carrying the operating heads, helical grooves in the said frames, with which engage the projections of the mounts of the collector lenses and the projections secured to the tubes, covers closing the tubes and having central openings, circular plates mounted eccentrically on the covers and carrying the eye-lenses, notches on the edges of the plates and between the eye-lenses, projections engaging with the said notches in the manner of a planetary toothed wheel and mounted on the upper parts of the driving frames, locking springs secured to the covers and coöperating with the notches for successively fixing the eye-lenses in front of the optical axes.

5. In a binocular optical system with three magnifying powers, and having Ramsden eye-pieces, the combination with a binocular body carrying object glasses, of tubes extending outside the body of the binoculars, horizontal and inclined grooves arranged in the tubes, projections secured to the tubes, variable field diaphragms and field lenses adjustable in the interior of the said tubes, driving projections arranged on the adjustable rims of the field diaphragms and on the mounts of the field lenses and passing through the inclined and horizontal grooves provided in the fixed tubes, sleeves sliding on the tubes and provided with vertical grooves for the projections secured to the tubes, helical grooves on the sleeves, with which engage the projections of the field lenses and those of the field diaphragms, driving frames arranged concentrically with the sliding sleeves for carrying the operating heads, helical grooves in the said frames for driving the projections secured to the tubes, covers closing the tubes and provided with central openings, circular plates mounted eccentrically on the covers and provided with eye-lenses, notches on the edges of the plates between the eye-lenses, projections engaging with the said notches in the manner of a planetary toothed wheel and secured to the upper parts of the driving frames, and locking springs secured to the covers and coöperating with the notches for successively locking the eye-lenses in front of the optical axes.

In testimony whereof I have signed my name to this specification in the presence of two subscribing witnesses.

JEAN BAPTISTE BAILLE-LEMAIRE.

Witnesses:
HANSON C. COXE,
GEORGES BONNEUIL.